US008695649B2

(12) United States Patent
Ricely

(10) Patent No.: US 8,695,649 B2
(45) Date of Patent: Apr. 15, 2014

(54) PORTION MEASURING AND DISPENSING DEVICE

(76) Inventor: Joseph Ryan Ricely, Glen Ellyn, IL (US)

( * ) Notice: Subject to any disclaimer, the term of this patent is extended or adjusted under 35 U.S.C. 154(b) by 648 days.

(21) Appl. No.: 12/645,068

(22) Filed: Dec. 22, 2009

(65) Prior Publication Data

US 2010/0154538 A1    Jun. 24, 2010

Related U.S. Application Data

(60) Provisional application No. 61/140,233, filed on Dec. 23, 2008.

(51) Int. Cl.
*G01F 19/00*    (2006.01)
*A61J 7/00*    (2006.01)

(52) U.S. Cl.
CPC ............ *G01F 19/002* (2013.01); *A61J 7/0023* (2013.01)
USPC .................. 141/334; 30/141; 72/426; 72/427

(58) Field of Classification Search
CPC ....... G01F 19/00; G01F 19/002; A61J 7/0023
USPC ................. 141/112, 98, 334; 30/141; 294/55; 73/426, 427, 429, 149, 428
See application file for complete search history.

(56) References Cited

U.S. PATENT DOCUMENTS

| 353,055 | A | * | 11/1886 | Dorr | 73/427 |
|---|---|---|---|---|---|
| 620,792 | A | * | 3/1899 | Middleton | 30/141 |
| 662,588 | A | * | 11/1900 | Bloom | 73/427 |
| 2,034,733 | A | * | 3/1936 | Wilkins | 73/426 |
| 3,727,306 | A | * | 4/1973 | Patik | 30/149 |
| 4,192,360 | A | * | 3/1980 | Rodriquez | 141/24 |
| 4,823,848 | A | * | 4/1989 | Sentmore et al. | 141/334 |
| 5,325,717 | A | * | 7/1994 | Robbins et al. | 73/429 |
| 6,675,482 | B1 | * | 1/2004 | Gilbert et al. | 30/141 |
| 6,751,873 | B2 | * | 6/2004 | Mattson et al. | 30/324 |
| 6,799,694 | B1 | * | 10/2004 | Scott | 220/763 |
| 6,974,056 | B2 | * | 12/2005 | Rea | 222/460 |
| 7,213,620 | B2 | * | 5/2007 | DeJonge | 141/22 |
| 7,441,676 | B2 | * | 10/2008 | Pickering, Jr. | 222/460 |
| 2008/0000092 | A1 | * | 1/2008 | Vanguard | 30/147 |
| 2010/0107417 | A1 | * | 5/2010 | Crisp | 30/122 |

* cited by examiner

*Primary Examiner* — Timothy L Maust
*Assistant Examiner* — Robert Bell, III
(74) *Attorney, Agent, or Firm* — Gary P. Topolosky

(57) ABSTRACT

A portion measuring and dispensing device comprises a chamber, a handle and a hingeable lid. The chamber comprises a bottom, a side structure attached to the bottom, and an aperture opposite of the bottom. The handle comprises a body defining a longitudinal channel with a first end opening to the chamber and a second end opening at a distal point on the handle. The second end is proportioned to be received within a mouth of a bottle.

12 Claims, 8 Drawing Sheets

PORTION MEASURING AND DISPENSING DEVICE

PRIORITY

This utility application claims the benefit of U.S. Provisional Patent Application No. 61/140,223 filed Dec. 23, 2008.

BACKGROUND OF THE INVENTION

1. Field of the Invention

This invention relates to the field of portion measuring and dispensing devices and, more particularly, to a device that can be used to scoop-out liquid or powder material from a container, to measure the volume of the scooped out material, and to transfer the material into a pre-selected container.

2. Background of the Invention

Ladles and other material retrieval devices are used to transfer liquid or solid material. Typically these devices comprise a chamber adapted to receive loosely associated material and a handle to facilitate holding of the chamber. The following recent U.S. patents are examples of ladles and scoops:

U.S. Pat. No. 7,503,212, "Adjustable measuring scoop" (2009) to Dalla Piazza et al. discloses a scoop having a movable partition such that the scoop size that can be chosen.

U.S. Pat. No. 7,141,033 "Sample collection device and method" (2006) to Kanjilal et al. discloses sample collection assemblies comprising a collection wand, a collection tube, an assay chamber, and a partition member. The collection wand is configured for collecting a predetermined sample volume. The partition member is adapted to prevent an excess of sample material from entering the assay chamber.

U.S. Pat. No. 7,441,676, "Device for dispensing media" (2006) to Pickering, Jr. discloses devices for dispensing media comprising a dispenser body, a funnel-shaped cover and a mechanism for securing the cover in the closed position to facilitate the dispensing of media through the spout. The funnel-shaped cover is attached to the body of the dispenser and includes an upper spout and a lower base.

U.S. Pat. No. 7,163,128 "Hard ice cream dispenser" (2007) to Savage discloses a device for dispensing hard ice cream. The device comprises a housing support structure; a drive assembly coupled to and supported by the housing, and a plunger drive means configured to displace a plunger. A sleeve, having a nozzle supported thereto, resides within the housing and is configured to receive an inverted container of hard ice cream therein.

These devices do not allow for easy collection of a variable but measured quantity of material and/or spillage-free transfer of the material into a small-mouth receiving container.

The aforementioned devices are not admitted to be prior art by their mention in this Background section.

A need exists in the art for a device to retrieve, measure and dispense liquid and/or solid material. The device should comprise a spillage-free means for pouring the material into a small-mouth receiving container such as a bottle. The device also should provide a means for varying its dispensing configuration to accommodate both different material being transferred and different openings of various types of receptacles.

SUMMARY OF THE INVENTION

An object of this invention is to provide a retrieval and dispensing device for use with liquids or solids that overcomes many of the disadvantages in the prior art.

Another object of the invention is to provide a retrieval device comprising a means for accurately measuring the volume of material retrieved from a container. A feature of this invention are volume-indicator means on the walls and handle of the device. An advantage of this invention is that at least two volumes of transferred material can be simultaneously measured by the device.

Yet another object of the invention is to provide a device that allows full and quick dispensing of a first material contained in the device. A feature of an embodiment of this invention is an adjustable means of egress for dispensing the material. An advantage of this invention is that all the material in the device can freely flow out of the device without risk of spillage. Another advantage is that the adjustable means allows for combining a second material to the first during transfer of the first material from the device.

A further object of the present invention is to provide spillage-free transfer from a scooper or other materials transfer device. A feature of the invention is a funnel means for transfer of material exiting the device. An advantage of the invention is that all of the material contained in the device can be transferred into a small-mouth receiving container such as a bottle.

Another object of the present invention is to provide covering means that may be added to improve ease of dispending from containers. A feature of the invention is that it incorporates a multifunctional cover contacting a longitudinally extending opening of a channel which defines a handle to the container to form a funnel. An advantage of the invention is that the cover, so positioned forms a funnel which provides a means for transferring contents of the container with a without spillage.

In brief, this invention provides a retrieval and dispensing device, the device comprising means for collecting, separating and measuring a plurality of volumes of a first loosely associated material, a means of egress for at least one of said plurality of volumes, wherein the means of egress is adjustable; and a transfer conduit intermediately disposed of the collecting means and means of egress and which comprises a means for facilitating mixing of a second material with the first material.

BRIEF DESCRIPTION OF THE DRAWING

The foregoing and other objects, aspects, and advantages of this invention will be better understood from the following detailed description of the preferred embodiments of the invention with reference to the drawing, in which.

DETAILED DESCRIPTION OF THE INVENTION

The foregoing summary, as well as the following detailed description of certain embodiments of the present invention, will be better understood when read in conjunction with the appended drawings.

As used herein, an element or step recited in the singular and proceeded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The present invention provides a retrieval and dispensing device for liquids and loosely associated solids that overcomes disadvantages in the prior art. The device comprises a chamber, wherein the chamber comprises a bottom, a side structure attached to the bottom, and an aperture opposite of the bottom and a handle attached to the chamber, wherein the handle comprises a body defining a longitudinal channel with a first end opening to the chamber and a second end opening at a distal point on the handle.

Figure 1:
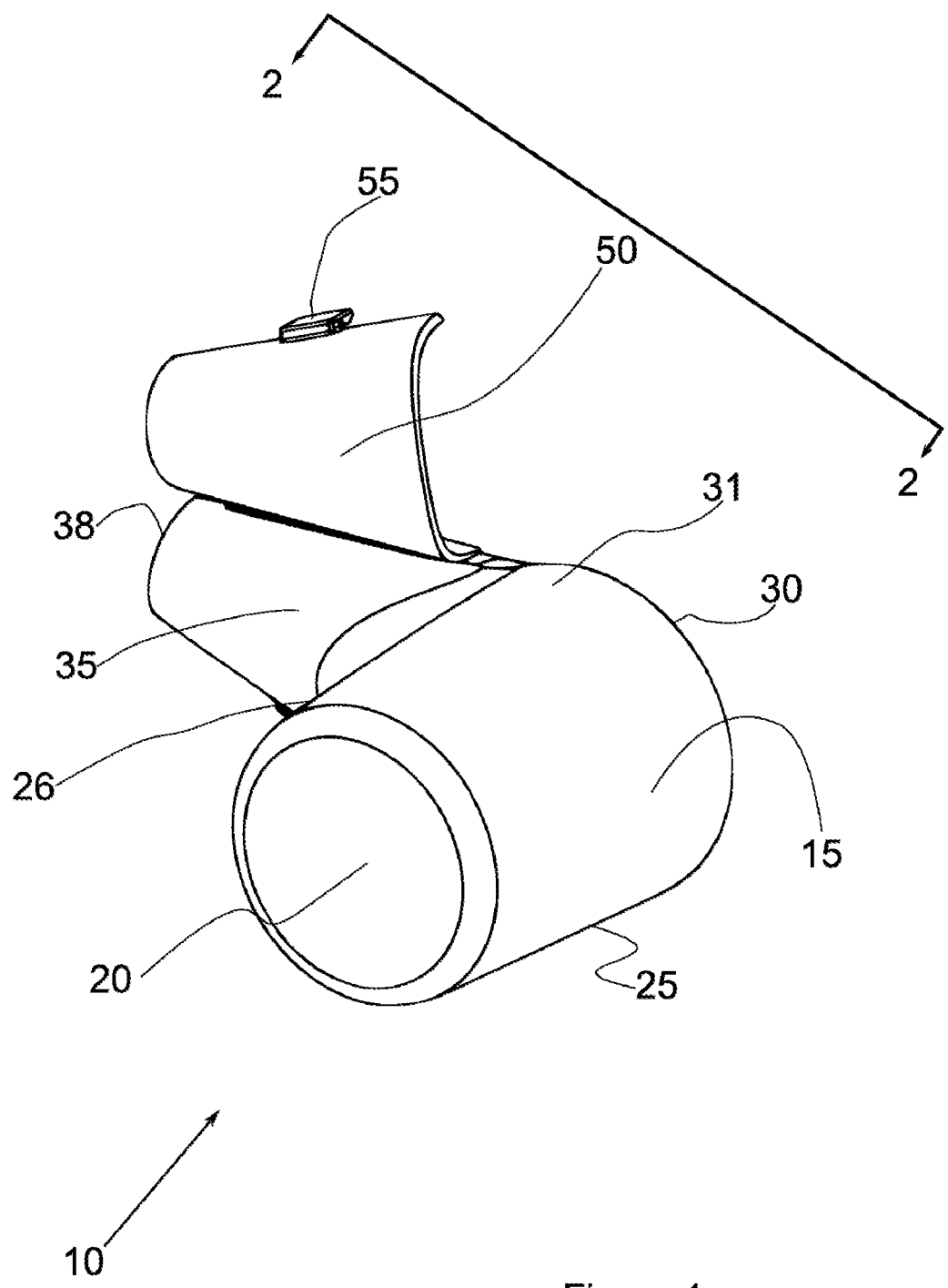
FIG. 1 is an elevational view of an exemplary embodiment of a retrieval and dispensing device for use with liquid and/or solid materials, in accordance with features of the present invention.
Figure 2:
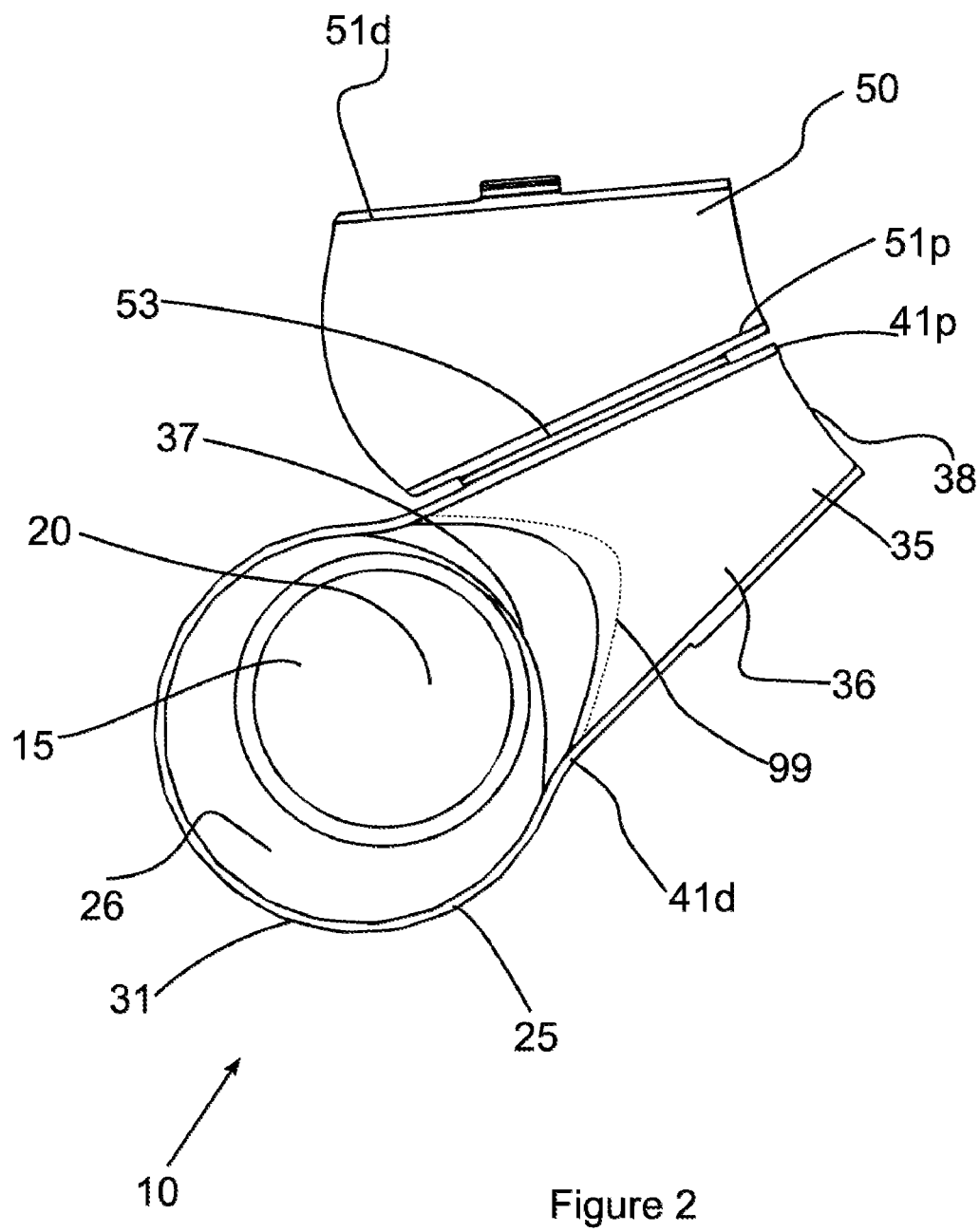
FIG. 2 is a top view of FIG. 1 taken along line 2-2, in accordance with features of the present invention.

FIG. 1 is a profile view of a preferred embodiment of the invented device and FIG. 2 is a top view of the device depicted in FIG. 1. Both figures show the device with its lid in an open position. This open configuration results in two troughs, defined by surfaces 40 and 50, which are substantially coplanar to each other and extending in the same direction.

As shown in FIG. 1, in the preferred embodiment of the device 10, a collection means such as a chamber 15 comprises a bottom 20, a side-structure 25 comprising a cylindrical wall 26 and an aperture 30 is bordered by a rim 31.

A separation means, such as a handle 35 is attached (or integrally molded) to the chamber 15 as it extends from the chamber wall 26. The handle 35 comprises a body defining a longitudinal channel 36 with a first end opening 37 to the chamber wall 26 and a second end opening 38 at a distal point on the handle. As mentioned supra, in one embodiment, the channel forms a trough, and therefore defines a concave passageway. The channel 36 is defined by two side walls 39, a bottom wall 40 that extends from the chamber bottom 20, and a rim 41 that extends from the chamber rim 31.

In an embodiment of the invention, the walls 39 of the handle are tangent to the chamber wall 26. The handle 35 has a frusto-conical structure so that the channel walls 39 and the channel bottom 40 all become narrower as they approach the second opening 38. Regions 42 where the channel walls 39 meet the channel bottom 40 assume an arcuate shape. In another embodiment, not shown, the walls of the handle form a funnel whose first opening is the bottom of the chamber.

Figure 7:
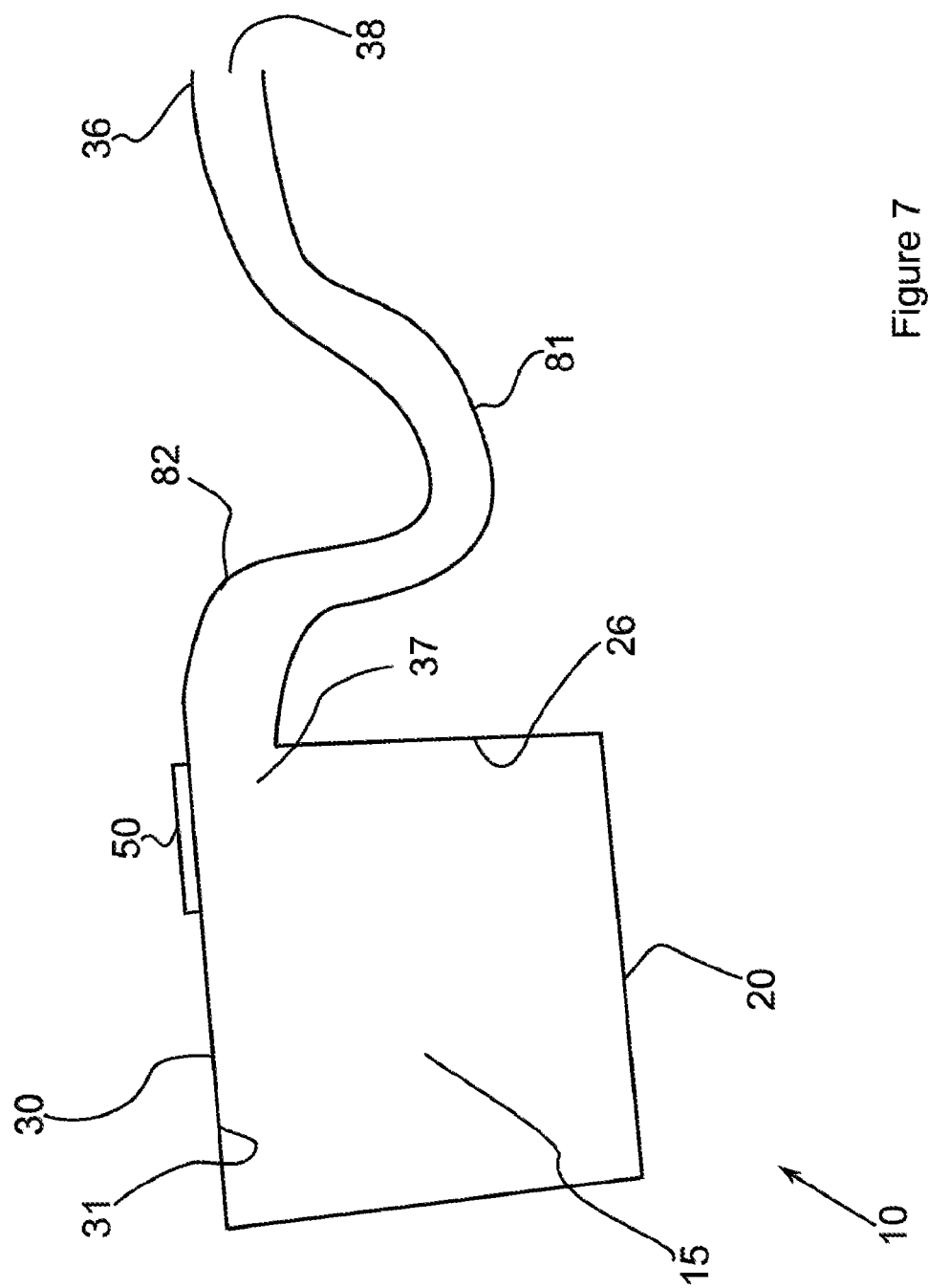
FIG. 7 is an elevational view of an alternative embodiment of a retrieval and dispensing device for use with liquid and/or solid materials, in accordance with features of the present invention.

In one embodiment, the channel 36 constitutes a tube that forms a trough, and therefore defines a concave passageway 81. (See FIG. 7) This tube is flexible in a region 82 intermediate the passageway 81 and the first end opening 37. In this arrangement the device may be used to collect a first material that is stored in the passageway 81 and then a second material that is stored in the chamber 15 before final transfer of both materials through the second end opening 38 to a bottle or other receptacle.

The device 10 also comprises a longitudinally extending lid 50. A first longitudinally extending edge 51p of the lid 50 is in hingeable communication with a first longitudinally extending portion 41p of the handle rim proximally positioned to the lid edge 51. A second longitudinally extending edge 51d of the lid 50 is proportioned so as to extend over and contact a second longitudinally extending portion 41d of the handle rim 41 which opposes the first longitudinally extending portion 41p of the handle so as to reside across a longitudinally extending axis α of the device. Preferably, the lid also contacts and extends over at least a section of the chamber rim 31, shown by the dotted line 47 in FIG. 2.

In one embodiment, the handle 35 includes a score line 99. The depth of said score line 99 extends about halfway through the substrate. The score extends transversely through the handle so as to be generally perpendicular to the longitudinal axis α of the device. Application of force to the score line 99 results in separation of the handle 35 from the chamber 15. Inasmuch as the score line 99 extends only halfway through the substrate, the amount of force required prevents unintentional separation of the handle 35 from the chamber 15. The resulting separated chamber 15 features an opening cross-section that is of a teardrop shape. The apex of the teardrop provides a means for forcing loosely associated material in the container into a narrow egress channel so as to prevent spillage when the container is tipped for emptying.

Figure 5:
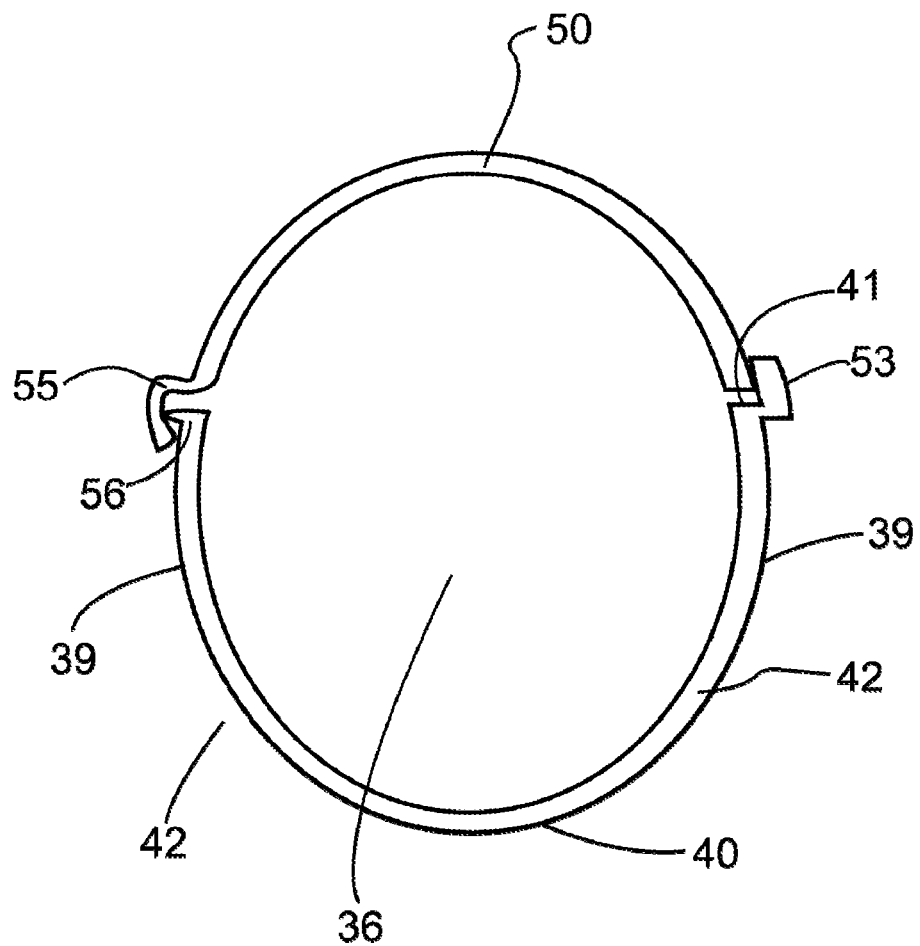
FIG. 5 is a cross-sectional view along line 5-5 of FIG. 3, in accordance with features of the present invention.

In one embodiment, the lid 50 is attached to the first longitudinally extending edge 41p by means of a flexible plastic strip 53 that constitutes a hinge. A latch 55 is attached to the second longitudinally extending edge 51d of the lid 50 opposite the hinge 53, said hook being adapted to be received by a complementary mating surface 56 attached to the channel wall 39. (See FIG. 5.) In another embodiment of the invention, not shown, the lid is attached to the first longitudinally extending edge by means other than a hinge. In one embodiment, the lid snaps on both the first longitudinally extending edge and the second longitudinally extending edge. In another embodiment, the lid is sonic welded to the extending edges.

Figure 6:
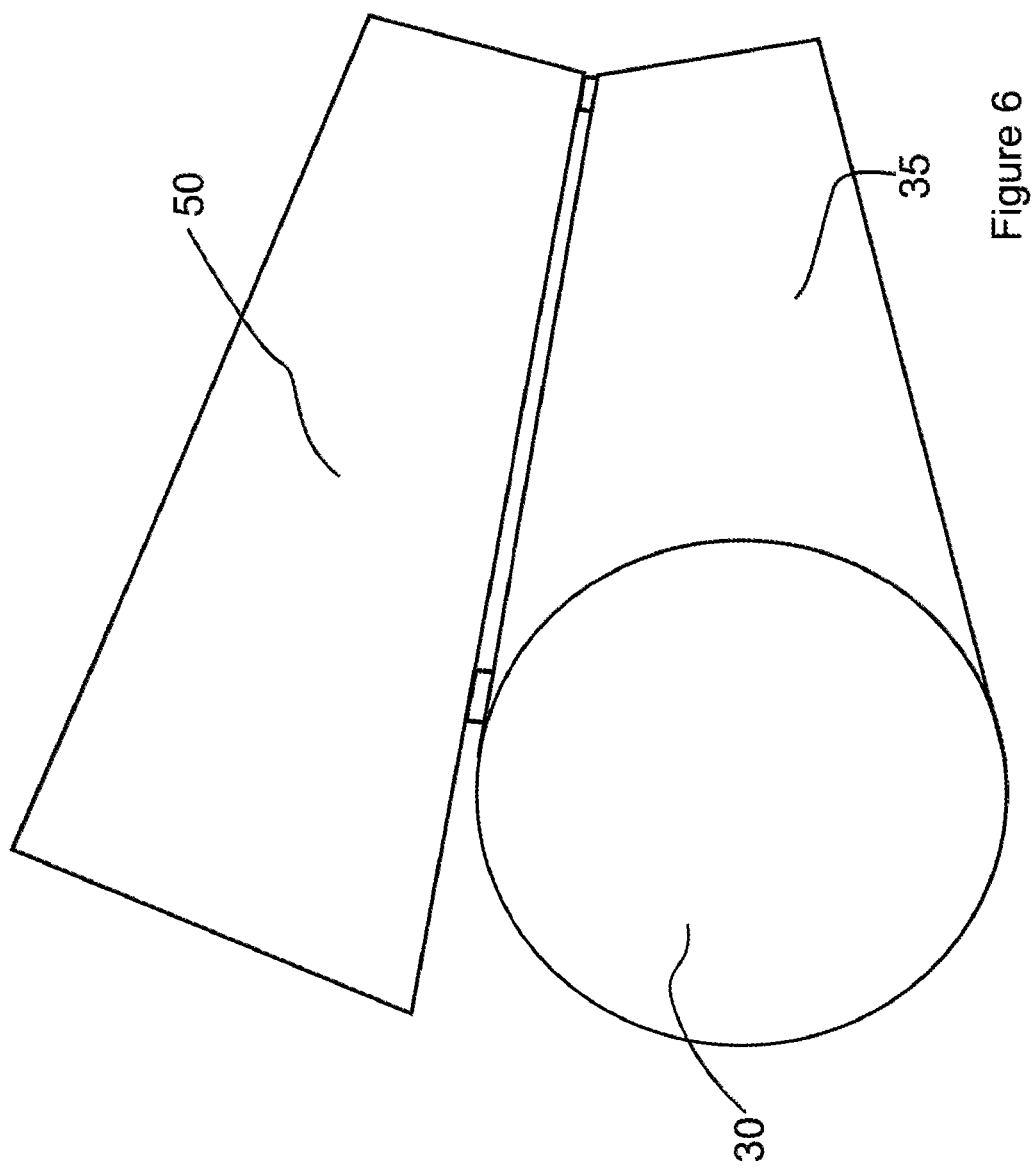
FIG. 6 is a top view of FIG. 3 but with the lid laid open, in accordance with features of the present invention.

In an embodiment of the invention, the lid 50 defines a convex surface so as to form an arch 57 over the channel 36. In another embodiment, the lid is planar, this planar configuration being especially suited to seal the entire opening of the chamber 15. (See also FIG. 6.)

The lid may be permanently attached, or attached by a tongue-in-groove arrangement, with rims 31 and 41 constituting tongues dimensioned to be received by a groove on the perimeter of the lid 50. If the rims 41 and 51 form an opening with parallel sides the lid may slide along the longitudinal axis α of the device, at times covering the handle 35 to form a conduit. In this instance, a depending facing surface of the lid opposes the bottom of a trough formed by a concave shaped handle. Simultaneous with the lid forming a conduit, in this position the lid also providing access to the chamber.

When the lid is slid to expose the trough formed by the handle, the lid covers the opening 30 of the chamber. This may prove beneficial to prevent spillage, particularly when storing a loaded device, or excessively moving the device more than a few feet.

Figure 3:
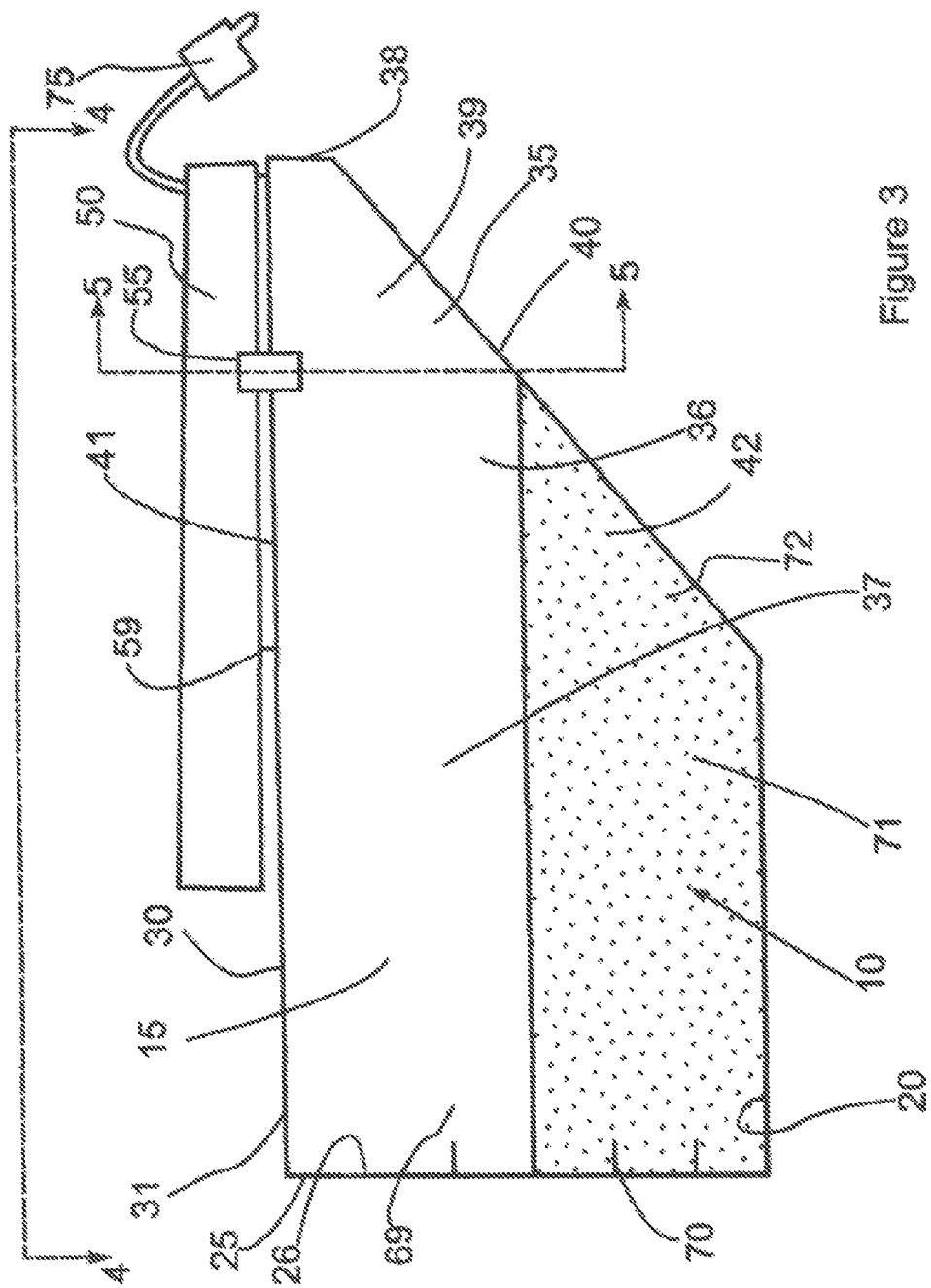
FIG. 3 is an elevational view of another embodiment of a retrieval and dispensing device for use with liquid or solid materials, in accordance with features of the present invention
Figure 4:
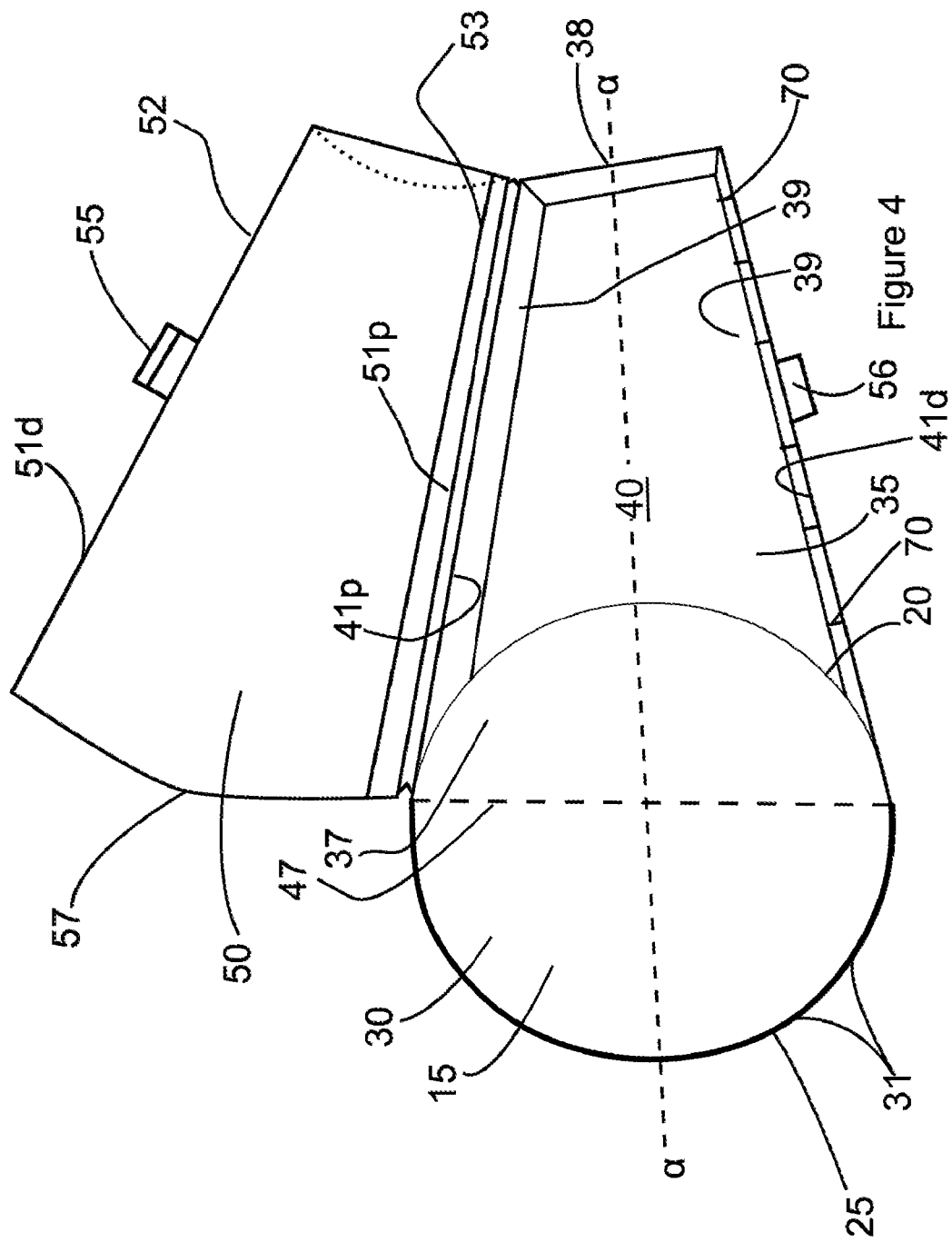
FIG. 4 is a top view of FIG. 3 along line 4-4, in accordance with features of the present invention.

At least a section of the device is fabricated from a light-transmitting material (i.e. either transparent or translucent) such as commonly used polyethylene or other suitable material, plastic or otherwise. Many methods of plastic shaping technology presently known in the art (including, but not limited to, injection molding, fused deposition (FDM), sterilothography (SLA)) are suitable for fabricating the device. As shown in FIGS. 1 and 3, a light transmitting section 69 of the chamber walls are inscribed with markings 70 showing the volume of the contents 68 of the device. These markings take into account the volume 71 contained in the chamber itself as well as the volume 72 contained in the handle.

At least some sections of the device may comprise materials such as wood, cardboard, paper. Embodiments encompassing components originating from plant fibers will be at least partially recyclable. Other source materials that may be subject to reclamation and recycling include aluminum and steel. The material is selected so as to not react with or otherwise contaminate the solids or liquids that will be transferred using the device.

The second end opening 38 at the distal point on the handle is dimensioned so as to form a spout that is received by the mouth of a bottle. A detachable stopper 75, such as a cork, or a friction fitting cork for that spout may be provided so that when the lid 50 covers the whole aperture of the chamber and is in the closed position, the device, and particularly the hollow handle, may be used to carry liquid or powder material. The invented device may be used with a wide variety of liquids having different viscosities and with powders that comprise grains or crystals.

Several modifications can be introduced. For instance, the walls of the chamber need not be cylindrical. A conical or pyramid structure, with the chamber opening 30 either smaller than or larger than the chamber bottom 20, is also suitable. The opening 37 of the handle into the chamber need not extend over the whole wall 26 of the chamber. The bottom of the handle may have a curved profile so as to be more easily grasped by the user. The distal opening 38 of the handle may be provided with a screw thread proportioned to receive the threaded top of a bottle. Finally the device may be so proportioned that the volume contained in the device corresponds to the amount prescribed for a treatment or an industrial process.

Figure 8:
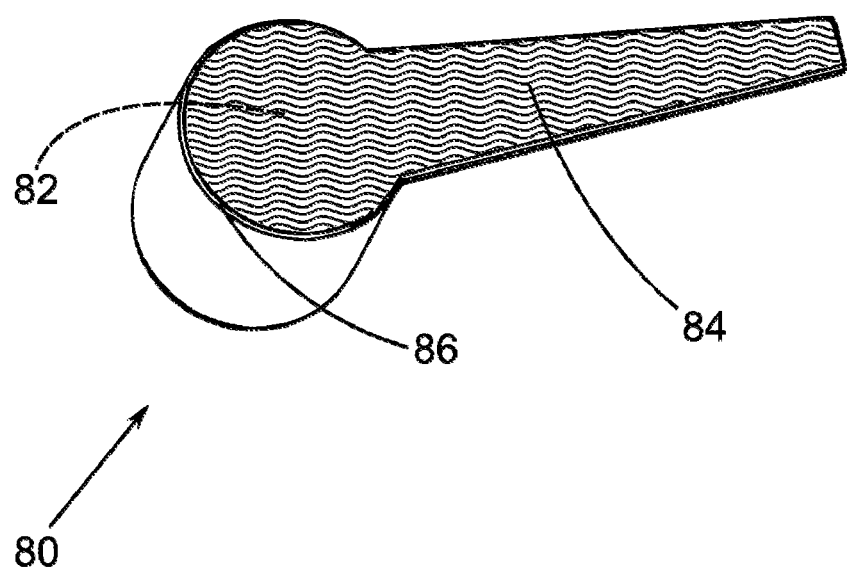
FIG. 8 is an elevational view of an alternative embodiment of a retrieval and dispensing device for use with liquid and/or solid materials, in accordance with features of the present invention.

An alternate embodiment is shown in FIG. 8. The embodiment shown therein includes a cover 84 which encapsulates substantially the entirety of the opening 82 of the device 80. The opening 82 is defined by interior planes of side walls 86. Inasmuch as the opening 82 is covered and closed, the contents of the device 80 may be transported without any risk of being spilled or lost. The embodiment 80 shown in FIG. 8 is used to transport contents prior to dispensing. In at least one embodiment, in order to dispense the contents, cover 84 is removed and replaced by a funnel lid, such as those depicted in FIGS. 1-7. As shown in FIG. 8, at least one embodiment of the device incorporates a full cover. Other embodiments, not shown, can include a partial cover that obstructs only approximately half of the opening 82 or other portions of the opening.

As is depicted in FIG. 8, the lid of that embodiment is substantially flat. The flat lid allows for stacking multiple containers, either with or without the lid in place. In another embodiment, not shown, the lid is reversibly deformable so as to be reconfigurable from a substantially arched configuration to a substantially flat configuration. For example, the reconfiguration is accomplished through actuation of a folding and collapsing mechanism, such as an accordion substrate, within the lid. In other embodiments, the folding and collapsing mechanism is facilitated by at least one flexible wire embedded in the lid wherein the at least one flexible wire is reconfigurable from a substantially flat configuration to an arched configuration.

It is to be understood that the above description is intended to be illustrative, and not restrictive. For example, the above-described embodiments (and/or aspects thereof) may be used in combination with each other. In addition many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

The invention claimed is:

1. A device for retrieving a first loosely associated material and dispensing said first loosely associated material into a container for facilitating mixing with a second material, the device comprising:
   a) means for collecting the first loosely associated material and measuring to a plurality of volumes marked on said collecting means; and
   b) a hollow handle affixed at one end to said collecting means and terminating in an end opening that narrows in size, said end opening adapted for serving as means of egress for said first loosely associated material from said collecting means into the container for mixing with the second material, said hollow handle having a lid hingeably connected along a length of the handle that, when hinged open, allows access to all of said hollow handle interior.

2. The device as recited in claim 1 wherein said hollow handle is integrally molded with the collection means.

3. A portion measuring and dispensing device comprising:
   a) a chamber, wherein the chamber comprises a bottom, a side structure attached to the bottom, and an aperture opposite of the bottom; and
   b) a hollow handle attached to the chamber, wherein the hollow handle has a lid hingeably connected along a length of the handle that, when hinged closed, comprises a funnel-like body defining a longitudinal channel with a first end opening to the chamber and a second end that narrows to a distal point on the hollow handle, and when hinged open, allows for full access to the hollow handle; wherein said second end is proportioned to be received within a mouth of a bottle; and with one or more volumetric indicators on said side structure wherein said indicators indicate total volume of contents in the hollow handle and in the chamber.

4. The portion measuring and dispensing device as recited in claim 3 wherein said handle is integrally molded to the chamber.

5. The portion measuring and dispensing device as recited in claim 3 wherein portions of the device comprise a light-transmitting substrate.

6. The portion measuring and dispensing device as recited in claim 5 wherein the light-transmitting substrate contains fluid volume marking indicia.

7. The portion measuring and dispensing device as recited in claim 3 wherein said handle distal opening comprises a thread allowing attachment of the device to the mouth of the bottle.

8. The portion measuring and dispensing device as recited in claim 3 wherein the lid covers the longitudinal channel of the handle.

9. The portion measuring and dispensing device as recited in claim 3 wherein the lid covers the longitudinal channel of the handle and at least a portion of the chamber.

10. The portion measuring and dispensing device as recited in claim 3 wherein the lid is detachable.

11. The portion measuring and dispensing device as recited in claim 5 wherein the light-transmitting substrate is transparent.

12. The portion measuring and dispensing device as recited in claim 5 wherein the light-transmitting substrate is translucent.

\* \* \* \* \*